Dec. 2, 1969          J. C. WAITE          3,481,810

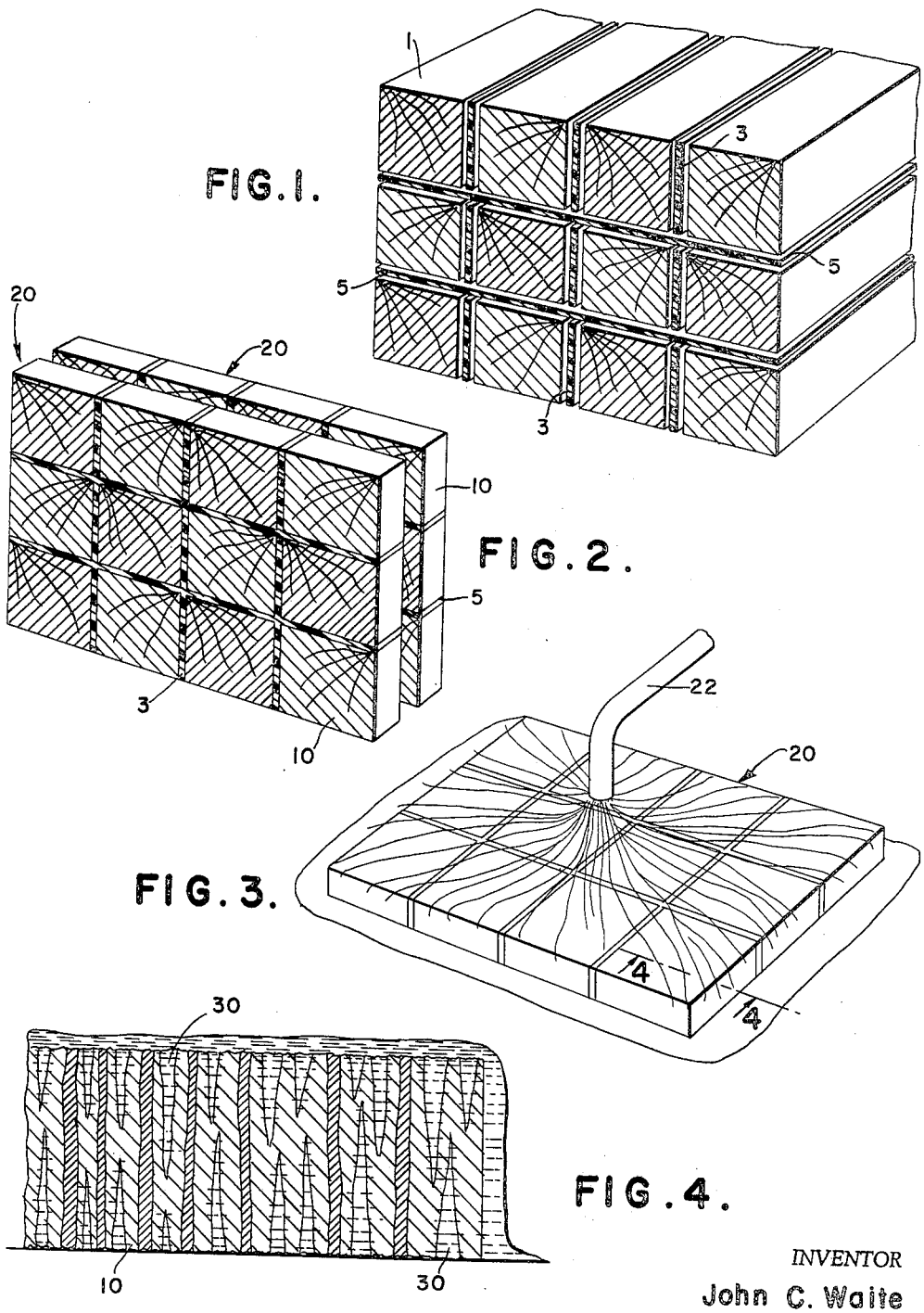

METHOD OF MANUFACTURING COMPOSITE FLOORING MATERIAL

Filed Dec. 20, 1965          2 Sheets-Sheet 2

INVENTOR
John C. Waite

BY Thomas, Weisman & Russell

ATTORNEYS

United States Patent Office 3,481,810
Patented Dec. 2, 1969

3,481,810
METHOD OF MANUFACTURING COMPOSITE FLOORING MATERIAL
John C. Waite, Box 206, Christiansted,
St. Croix, Virgin Islands
Filed Dec. 20, 1965, Ser. No. 515,056
Int. Cl. B29c *17/14;* B32b *31/12, 21/08*
U.S. Cl. 156—242                                       7 Claims

ABSTRACT OF THE DISCLOSURE

A process for the preparation of end-grain wood block flooring wherein elongated rectangular pieces of wood are first fitted within a thermoplastic resin matrix of crossing members to form a wood-resin composite, cutting said composite across the grain of the wood to form a series of end-grain slabs, applying a first unpolymerized thermosetting resin to the surfaces of said slabs, applying a second like or similar resin to all sides of the composite by injection molding, and then polymerizing the first and second resins.

---

This invention relates to a composite flooring material and is more particularly directed to a composite unit fabricated of end-grained wood blocks imbedded in a thermoplastic resin matrix in which the end-grain wood blocks are additionally bonded in and to the matrix not only by the penetration of the resin into the intertices in the wood, but also by polymerization of such matrix resin through the pores, vessels and voids inherently present in such wood blocks.

As is well known in the industry, conventional wood flooring may be classified by type and also by grain of the wood. Strip flooring and block or parquet flooring are types of flooring, and grain classification would include flat grain, edge grain, and end grain. Each type of floor installation presents its own characteristic problems. For example, flat grain strip flooring has the inherent tendency to split, check, shrink and warp. The installation and finishing of strip flooring contemplates a skilled and sophisticated technique; usually subflooring is required to meet the qualifications of moisture-proofing, stability, resilience, etc. Thus, installation becomes relatively complex and expensive. Although edge grain strip flooring is somewhat superior in stability, it otherwise also exhibits these inherent problems with regard to installation and maintenance.

Again, block flooring of either the flat grain or parquet type presents similar complications. Usually tongue and groove installations are called for, sub-flooring is required, and, although parquet type blocks may exhibit more dimensional stability than strip flooring or end-grain installations, they still require the same skill, sophistication and expense of installation typical of strip flooring.

End-grain blocks have been used in the past. Although these afford the most durable and satisfactory wearing surface of the several types of wood floors, their present use is limited to very heavy industrial areas, or other public areas as gymnasiums, etc., subjected to very heavy traffic. As now manufactured, end-grain blocks are moisture proofed, stabilized to a limited extent by such media as coal-tar creosote saturation, etc., but even after such superficial stabilization, provision must be made in the finished floor for extensive and expensive installation of expansion joints, fillers for voids, etc., as well as protection from wetting-drying cycles. Although end-grain block flooring in its natural state can present a striking and esthetically pleasing appearance, such, as developed by the present state of the art, is generally unsuitable for residential or commercial installations where appearance of the floor is a primary and significant consideration.

It is thus a primary objective of the instant invention to provide a composite unit utilizing end-grain blocks which are suitable for general use—residential, commercial and light industrial, such composite unit combining the desirable esthetic appearance of end-grain installations with the required durability, ease of maintenance and, as well, ease of installation.

It is a further object of the invention to provide a composite end-grain flooring unit exhibiting not only the superior durability of any end-grain wood block, but supplementing that natural quality with additional abrasion and impact resistance due to the incorporation in the block of a thermosetting resin which not only is present as a sort of polymerized filler in the wood but also forms an integral part of the surface of the block.

Another objective of the invention is the provision of a composite unit of the described type which materially contributes to ease of installation throughout unlimited areas of wood surface flooring because of the elimination of the usual and necessary expansion joints or fills required in conventional flooring areas.

Another object of the invention is to provide a unit of this type which not only, after installation, presents a high degree of elasticity and flexibility to thereby compensate for thermal or other stress action in underlying substrates, but to obtain this objective of resiliency and shock absorption without the use of other external, mechanical devices or expensive and complex underlayments.

A further object of the invention is the provision of a pre-designed, pre-furnished composite flooring unit ready for immediate installation as an integral vapor barrier over sub-floors of concrete, composition board or wood without the use of a membrane, collodion, asphalt, or other type of intermediate water proofing.

In the case of the present invention, impregnation is accomplished by saturating the wood with a water-soluble resin and effective impregnation is further accomplished by use of relatively thin slices of wood cut across the grain (in the preferred embodiment of the invention, from about ¼ inch to ⅜ inch in thickness). Thus adequate impregnation is readily obtainable, resulting in a high degree of stabilization when the resin is polymerized within the wood. The degree of impregnation and stabilization may vary somewhat depending on the type, density and other characteristics of the wood to be stabilized, as in sap wood and hard wood of the same species or as in soft wood and hard wood of different species. At any rate, in the present invention, to secure practical, usable shapes and dimensions, it is of prime importance that the stabilized wood blocks be incorporated into a compact unit that can be molded to desired final shapes and dimensions. To achieve this function, thermosetting resins are molded in such a way that the stabilized wood blocks are imbedded in, partially filled with, and surrounded by a polymerized resin matrix. Such a matrix serves multiple purposes; it imparts final shape and dimension to the flooring unit; consisting of elastic matrices between and around the individual wood blocks, it provides for residual expansion-retraction reactions in the wood and for thermal reactions in the composite unit itself; it forms a moisture barrier between substrate and flooring unit; it permits of locking the individual wood blocks within the composite unit in a permanent pattern relationship by penetration and polymerization of the matrix resin within pores, vessels, cells and voids of the wood block; and, finally, when the resin is injected molded about the composite it functions as a filler and sealer for the finished surface of the wood.

Other objectives and advantages of my invention will be apparent to those skilled in the art from the following more detailed description thereof, wherein reference is made to several explanatory drawings and wherein:

FIGURE 1 is a perspective, rather diagrammatic view of the elongated blocks positioned within a conforming plastic or resin matrix prior to the bonding of the wood to the matrix;

FIGURE 2 is very similar to FIGURE 1 but illustrating how, after positioning the elongated blocks within the matrix, and preliminary bonding thereto, the composite block matrix unit is sliced or cut in sections of desired thickness, and these sections, after subsequent treatment, form the ultimate composite unit;

Figure 5:
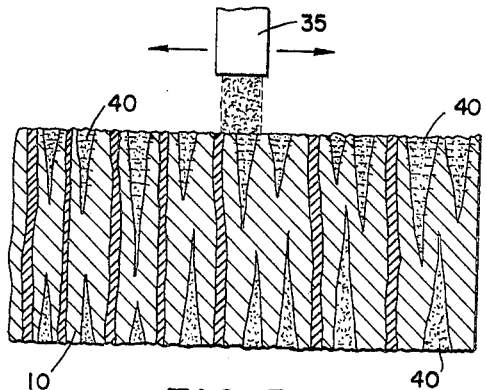
Figure 6:
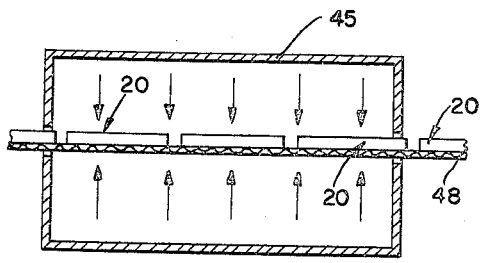
Figure 7:
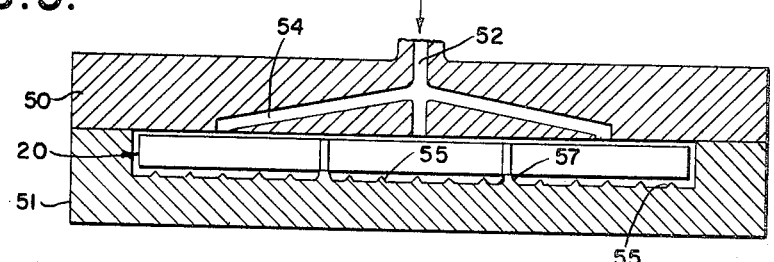
Figure 8:
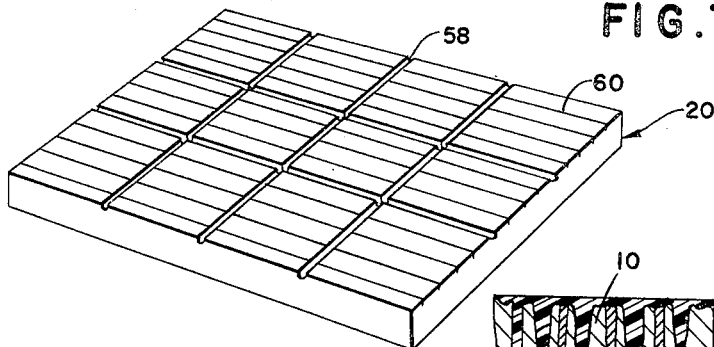
Figure 9:
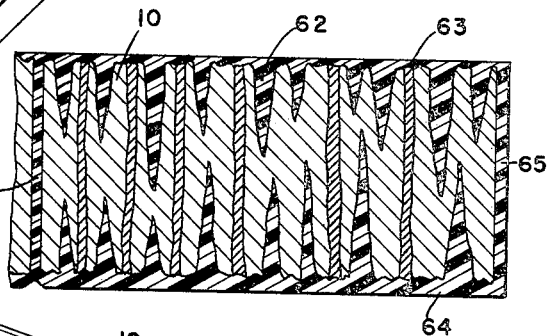
Figure 10:
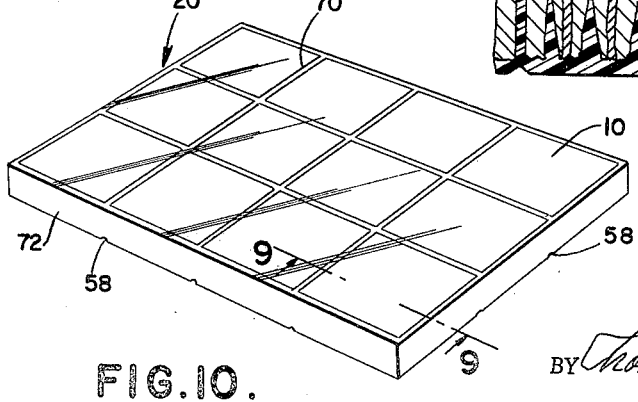

FIGURE 3 diagrammatically illustrates the step of wetting down or saturating the matrix-block unit by the flow of water across the segment, thereby to keep the wood "green";

FIGURE 4 is a section view taken on the line 4—4 of FIGURE 3, illustrating, in greatly exaggerated form, the penetration of water into the pores or interstices of each of the end grain blocks;

FIGURE 5 is an exaggerated cross-sectional view of a block being treated with a suitable thermosetting resin, indicating also in exaggerated form the penetration of the resin into the interstices or openings in the end grain block;

FIGURE 6 diametrically illustrates a method of drying each of the composite units after treatment of the resin by passage thereof through a suitable drying chamber or kiln, the composite units being carried through the chamber on an appropriate conveyor belt;

FIGURE 7 is illustrative of the steps of subjecting the composite unit to a molding procedure wherein additional thermosetting resin is forced, by heat and pressure, into the pores of the wood and around the sides and edges of the complete block, so that the latter is partially filled out and completely imbedded in the resin;

FIGURE 8 is a view, in perspective of the underside of the composite block after molding (as in FIGURE 7), illustrating the corrugated surface thereof, suitable for interconnection with or adherence to any type of subflooring;

FIGURE 9 is a diagrammatic cross-section taken on the line 9—9 of FIGURE 10, through the composite unit illustrating the penetration of the resin into the pores of the wood, and illustrating also the complete coverage, on all sides of the unit, with the resinous material; and FIGURE 10 is a view of the finished composite unit as it has been preformed for immediate and convenient installation.

From the following description of the invention, it will be observed that there are two basic concepts or processes involved in producing the finished composite unit. The first is physiochemical: impregnation of the wood with stabilizing resin and subsequent chemical modification of the cells of the wood when the resin is polymerized. The second is mechanical: comprising the combination of laminating and molding operations that provide the final shape and dimension to the flooring unit; such also provides for a mechanical penetration of the matrix resin into the wood.

Referring more particularly to the drawings and as shown in FIGURE 1, multiple strips of green wood 1 are placed in the appropriate spaces provided by a matrix consisting of (as here shown) vertical strips 3 of the thermosetting resin and horizontally disposed intermediate strips 5 of resin, thus forming the resin matrix. The resinous strips thus perform as spacers with the wood strips separated from each other by these matrices. In FIGURE 1 the wood strips are elongated with respect to the grain and square in configuration. The matrix resin is first bonded or laminated to the wood to form a composite timber; this is done by methods and processes now in common use to form laminated wood beams, decking, etc. Such strips as form the matrices between these individual blocks function to absorb or compensate for any residual reactions of expansion or contraction in the wood that may not be eliminated as a result of the following stabilization process. To so function, the strips depend upon the elasticity of the plastic or resin from which they are formulated and this modulus of elasticity will vary considerably among the several preferred thermosetting resins of which the strips may be formed. As a practical matter, this composite block might involve use of fairly rigid matrix strips to enhance wearing properties as designed for commercial or light industrial use, or a more resilient or flexible matrix as designed for residential or more occasional use. Naturally, the more rigid the matrix, the thicker the strips; and, in the preferred embodiment of the invention, the range in thickness thereof can vary from between 1/32" to about 3/16".

After this block has been formed into the laminated structure as shown in FIGURE 2 and, of course, after setting the laminating adhesive, by polymerization, catalytic reaction or other process, the laminated, composite timber is cut at right angles to the length thereof, or across the grain of the wood. The block is thus segmented into uniform slices which, in the preferred variation of the invention, may range from 1/4" to 1/2" in thickness, depending upon the grade of flooring to be manufactured. Thus the resulting composite, here generally indicated at 20, consists of a number of square wood segments 10 separated from each other by the matrix members 5 and 10. The grain of the wood is vertical with relation to the flat dimension of the block, this relationship being commonly referred to as the "end grain" heretofore referred to.

It is preferred that the wood be preserved in its "green" state so far as possible, and to this end, the composite blocks, after cutting in the manner indicated in FIGURE 2, are simply wetted down with water provided from a usual source 22. This compensates for any loss of moisture resulting from the laminating and cutting operations. The absorption of moisture into the interstices of the wood is graphically illustrated in the exaggerated view or cross-section of FIGURE 4.

It should here be noted that water absorption, as well as the later impregnation or absorption of resinous material, is facilitated by the fact that only the end grain type of block or composite is here contemplated, it being a fact that absorption of any liquid material progresses at a more rapid rate into the end grain than otherwise.

These "green" or wet blocks are then saturated with a thermosetting resin supplied from a suitable source 35 as diagrammatically shown in FIGURE 5. A preferred resin is of the phenol-formaldehyde type, which is water soluble, unpolymerized and somewhat alkaline with a pH of from about 7.5 to 8.5. A commercial form of this resin is known as "Bakelite Resinoid XR 5995."

Other resins may be suitable, such as urea-formaldehyde resins, melamine-formaldehyde resins, acryloid plastics which are derived from methyl, ethyl and higher alkyl acrylates, and also the methacrylates. Also included among preferred polymers are the polyurethanes which are becoming increasingly available on a large scale and the polyacetals, especially polyformaldehydes such as "Delrin" and "Celcon." Methyl-urea base materials may also be suitable.

Actually, and insofar as the instant invention be concerned any resin would be suitable if these basic qualifications are met. That it be thermosetting, i.e., will polymerize upon application of heat at substantially above ambient temperatures; that it be liquid at ambient temperatures and temperatures under its polymerizable temperature; that it be of proper viscosity at ambient or near ambient temperatures to permit ready absorption into the end-grain pores and voids, as herein set forth; and that it be water soluble.

An appropriate time period is allowed after application of such a water soluble resin to the end grain of the blocks in order to achieve optimum diffusion of the resin into the cell walls, pores, vessels and voids in the wood. This also is graphically illustrated in FIGURE 5 wherein resin penetration into the interstices of the wood is indicated at 40. Inasmuch as the wood blocks in the preferred form of the invention are relatively thin and saturation is induced through the end-grain, there is little difficulty in securing rapid and adequate diffusion of the resin through the block.

The resin remains unpolymerized at this stage. In any event, during this process of diffusion or absorption, the resin becomes bonded chemically to the hydroxyl radical of the gypsum cellulose and lignin in the wood, components that normally absorb water. This physiochemical modification of the cells of the wood reduces the hygroscopic property of the wood and thus provides a high degree of dimensional stability to the wood of the composite unit.

As before indicated, it is of essential significance that the blocks are treated through the end-grain for diffusion of the resin into the wood in this direction is accomplished far more effectively and rapidly than would be the case were saturation and diffusion attempted through the flat grain as in the case, for example, of plywood. Conversely, more rapid and uniform drying is possible with relatively thin end-grain elements than can occur with respect to flat-grain surfaces.

The composite blocks 20, the wood of which is now impregnated with as yet an unpolymerized stabilizing resin, are dried in a drying chamber or kiln 45 through which these composites are passed and wherein they are subjected to a flow of dry air at elevated temperatures. The composites may be passed through the kiln upon a perforated or open webbed belt 48, such manner of air drying being well-known to the art. The temperature within the chamber and the time of treatment therewithin should be so controlled as to reduce the moisture content of the wood to a range of between 10 to 15%. After drying, the stabilizing resin which has not been diffused into the cell walls of the wood remains as a residual coating over the pores, vessels and voids in the wood.

As indicated, drying of the end-grain blocks is rapid and uniform, as compared with the drying of conventional lumber or plywood. In practice, forced hot air at temperatures of about 150° to 160° F. may be effectively utilized without an adverse effect upon the wood. However, drying temperatures must be held under the polymerization temperature of the stabilizing resin used (normally a range of from 300° to 450° F.) to maintain the resin in an unpolymerized state for further processing, as will be described.

Subsequent to this drying procedure, the composite block 20 is placed in an injection mold of the desired final shape and dimension of the composite flooring unit to be produced. Referring to FIGURE 7, the mold here shown is of the split type consisting of opposed half portions 50 and 51. The upper half 50 is provided with a resin supply duct 52 to which are interconnected additional conduits 54 in order to uniformly supply the resin throughout the interior of the mold, as is common practice. The bottom half 51 of the mold is provided with a series of small ridges 55 and also a series of larger ridges 57, the latter corresponding or being complementary to the plastic matrices 3 and 5, thereby to render the bottom of the composite uneven or corrugated, for purposes of ultimate adhesion to an underfloor.

It will be noted that the dimension of the mold form in the lower mold 51 is somewhat greater than the overall dimension of the composite 20 so that the resin is permitted to flow entirely around the block, also in the manner indicated in FIGURE 7. In this step, a thermosetting resin of the type hereinbefore described, and which may, if preferred, be the same as the stabilizing resin or that used to form the matrix in the laminating process, is forced by heat and pressure into the pores, vessels and voids of the wood, and around the top, bottom, sides and edges of the composite block so that the wood blocks are partially filled with and completely imbedded in the resin.

In other words, in this stage of the procedure the chosen resin is heated to its flow point and injected into the mold at sufficient pressure to fill all voids in the wood and the mold, as is common practice in producing any thermoplastic or thermosetting product in an injection mold. The process is completed by bringing the plastic to its design setting heat, thereby effecting polymerization, and ejecting the completed composite block from the mold. Actual design of the mold, both for production efficiency as well as dimension of the product, can be subject to considerable variation by those skilled in the art of pressure molding.

At any rate, and as indicated, heat is applied to this mold in an amount sufficient to completely polymerize both the stabilizing resin and the matrix resin. As noted above, the temperature range here involved to achieve this purpose, and having in mind the particular resin utilized, should be between about 300° to 450° F.

Upon removal from the mold, the underside of the composite, and as shown in FIGURE 8, is provided with a series of serrations or grooves 60, and with larger grooves 58 which match or correspond to the plastic strips forming the matrix. The purpose of the latter is, and as above mentioned, to provide an irregular surface upon the bottom of the block so that in final placement upon a sub-floor, the composite can be readily attached thereto by means of usual adhesives or cements.

As also indicated in the foregoing, the injection mold used to form the final shape and dimension of the composite unit is designed to mold a relatively thick film of polymerized resin on the under surface of the composite unit, this film serving as a water-proof membrane and base for setting the floor, in units, upon the sub-floor. The molding-polymerizing operation preferably is conducted, and the mold so made, such as to leave a thinner film of resin upon the opposite or upper flat surface (this is somewhat graphically indicated in FIGURE 7). Optionally, this latter film may be left as protection for this surface, or removed by sanding or a like operation, after the composites are installed as flooring. Also, this upper resinous film may be removed when the composite is taken from the mold, thus to expose the surface of the individual wood blocks and injected quantities of polymerized resin in the pores and voids of the wood. The composite may thus be imparted with a pre-formed surface by bringing to a uniform plane surface not only the wood blocks but the matrix elements between and around them.

The molding operation also forms a continuous film around the edges of the composite. A manifestly exaggerated form of this is illustrated in FIGURE 9 where the resin completely seals the top surface, as at 63, the bottom surface, as at 64, and the side wall 65. One of the interior matrices is illustrated at 68. Penetration of the resin into the interstices of the wood is shown at 62. This continuous film around sides and edges of the composite also serves the same expansion joint function as the matrices between the individual wood blocks, here particularly having reference to a completed installation, when multiples of the composite are positioned adjacent each other.

The completed composite unit is shown in FIGURE 10, the upper surface being flat and uniform and overlaid with polymerized resin. The under surface, with a thicker resinous surface, exhibits the serrations 58, these particular ones conforming to the positioning of the individual plastic matrices.

Reference has heretofore been made to the dual aspects of the involved concept, i.e., the physiochemical as well as mechanical nature of the bonding procedure. The essential factor in the first impregnation and stabilization of the wood is the polymerization of the impregnated resin within the actual cell structure of the wood. The second penetration by the resin performed during the ejection molding procedure is mechanical rather than physiochemical and this second aspect serves the following functions:

There is provided an additional stabilization of the wood by a further mechanical filling and sealing of the pores and voids in the wood. The cells of the block are additionally mechanically sealed against moisture penetration and any residual swelling-shrinking action not inhibited by the physiochemical stabilization. In addition, the wood is further stabilized by "crowding" of the vessels and voids in the wood by the resin to thus further restrict movement of the cellular structure within such voids. Penetration and polymerization of the resin in the wood firmly bonds the wood to the composite unit by the formation, in the interstices of the block, of innumerable filaments of resin ranging from visible to microscopically fine, which filaments upon polymerization become an integral part of the matrix structure. In addition, these resin filaments serve a further significant function—they form a complete and permanent filler for the surface provided as the wearing surface of the floor. Stated differently, these numerous resinous filaments have exposed ends, which, by sanding and finishing operations on the floor, produce a uniormly dense surface to the finished floor which enhances significantly the appearance and wearing quality thereof.

From the foregoing explanation, it will appear that the basic concept of this invention revolves about the molding of polymerizable, thermosetting resins in such a manner that the stabilized wood blocks are imbedded in, partially filled with, said surrounded by a polymerized resin matrix. The result is a composite end-grain unit that can be installed over any smooth substrate normally encountered in either new or existing construction, and this without requiring the services of skilled and experienced workmen and without the use of specialized tools and methods. The advantages are many. For example, a dimensional stability in particular flowing from a built-in combination resistant to thermal and mechanical stresses; in addition, tensional uniformity is obtained by molding the unit to close tolerances in all dimensions. Of basic significance also is that these composites, when installed, perform as integral moisture barriers eliminating the need of equivalent and extra devices such as sub-floor membranes or moisture-proofing procedures of one sort or another.

The ease of handling or installation of the composites compare favorably with simplified installation techniques that are characteristic of vinyl, asbestos, rubber or other equivalent floor tiling systems. Although for new construction, a protective film of polymerized resin may be left on the surface to protect that surface pending completion of other building operations prior to finishing of the floor, the composite of this invention representing an essentially pre-formed surface that can be used immediately after installation.

Relating to these properties which have just been described is the fact that the finished floor surface requires a minimum of care and maintenance in that the surface is essentially stain-proof, resists imbedment of foreign matter and has a relatively high abrasion resistance, particularly if compared to other flooring products now in common use. These properties again directly flow from the filling-sealing effect of the absorbed resin which has been polymerized in situ in the voids of the wood and as has been described above.

While the invention and particularly with respect to its process phases has been described in the foregoing with regard to a specific embodiment thereof as representing the most practical and efficient system for mass production of the composite flooring, it will be apparent that variations of sequence and variations in the process itself are possible. One example of this would be the elimination of the first stage of the process having to do with the stabilization of the wood and handling of the individual end-grain blocks without the matrix through operations prior to final injection molding. The interblock matrices could be formed during such injection molding step, as contemplated by the instant process. It should be additionally noted that the matrix resin can be formulated of any desired and predetermined color, i.e., either a color matching that of the end-grain blocks or contrasting thereto. The matrices, as a practical matter, preferably fall within the range of from $\frac{1}{32}$ inch to $\frac{3}{16}$ inch thick and $\frac{1}{4}''$ to $\frac{3}{8}''$ wide; and for usual flooring purposes, the composite block will normally be of a size of from eight to twenty-four inches in diameter, and square, rectangular, or of any desired, interfitting configuration.

It is apparent also that other equivalents or alternates may be utilized in the practice of the invention without departing from the spirit thereof; however the invention is to be considered as limited in scope only insofar as may be required by the limitations present in the claims appended hereto.

I claim:

1. A process for the production of end-grain wood flooring and like elements which comprises positioning a multiple number of elongated wood blocks within the rectangular configuration formed by the crossing members of a matrix of synthetic thermosetting resinous material, thus to separate each of said wood blocks from the others thereof by said resinous members, said matrix and said wood blocks forming an elongated composite, bonding said matrix to said wood blocks, making a series of cuts across said composite at right angles to the grain of said blocks to segment said composite into uniform slabs, each of said slabs exposing the end grain of the wood on each side thereof, applying a first unpolymerized thermosetting resin to each of said end grain surfaces of said composite to fill the pores and voids of said end grain slabs therewith, said first thermosetting resin bonding to the hydroxyl radicals of the gypsum cellulose and lignin in the wood so as to reduce the hygroscopic property of the wood, air drying the composite at a non-polymerizing temperature of below 300° F. to reduce the moisture content of said slabs to about 10% to 15%, applying a second unpolymerized resin to all sides of said end grain slabs and said matrix by injecting moulding, and then polymerizing said first and second resins, whereby to form a bonded resin-wood composite with the opposed end-grain slabs thereof being sealed with said resin and to said matrix.

2. The invention as defined in claim 1 wherein said composite, cut across the grain after said blocks are bonded to the matrix, is formed into a plurality of said end grain slabs of a thickness substantially less than the width thereof.

3. The process as defined in claim 1 wherein said first and second thermosetting resins are selected from the group consisting of urea-formaldehyde resins, acryloid resins, acrylate resins, methacrylate resins, methyl urea resins, polyacetal resins and polyformaldehyde resins.

4. The invention of claim 1 wherein said injection molding step includes the heating of said composite in an amount to effect polymerization of said first and second resins, thereby chemically bonding the resin to the wood constituents and mechanically locking the interior membranes of said end grain slabs in rigid relationship, and the matrix and said end grain slabs in fixed and locked position.

5. The invention of claim 1 wherein said first and second resins are polymerized after said injection molding by the application of heat thereto.

6. The invention as defined in claim 1 wherein an irregular surface is provided upon the bottom of said composite during said injection molding step to facilitate adherence of said composite to a sub-flooring material.

7. The invention as defined in claim 1 wherein said polymerizing of said first and second resins is performed at temperatures of about 300° F. to 450° F.

References Cited

UNITED STATES PATENTS

| | | | |
|---|---|---|---|
| 1,931,650 | 10/1933 | Elmendorf | 156—297 X |
| 2,062,590 | 12/1936 | Lundquist | 156—264 X |
| 2,630,395 | 3/1953 | McCullough et al. | 161—406 X |

FOREIGN PATENTS 856,126  12/1960  Great Britain.

OTHER REFERENCES

Stamm, Alfred J.: Processing of Wood, Chemical Publishing Co. Inc., New York, 1953, pp. 207–214.

ROBERT F. BURNETT, Primary Examiner

R. L. MAY, Assistant Examiner

U.S. Cl. X.R.

161—5, 38, 43, 69; 264—261; 156—303.1, 304